US011047468B2

(12) United States Patent
Ishiyama et al.

(10) Patent No.: US 11,047,468 B2
(45) Date of Patent: Jun. 29, 2021

(54) HYDRAULICALLY ACTUATED TRANSMISSION

(71) Applicant: Mazda Motor Corporation, Hiroshima (JP)

(72) Inventors: Takashi Ishiyama, Higashihiroshima (JP); Fumitoshi Sato, Nasukarasuyama (JP); Hiroyuki Okayama, Hiroshima (JP); Masuhiro Kawakami, Higashihiroshima (JP); Tomokazu Kinoshita, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 266 days.

(21) Appl. No.: 16/348,294

(22) PCT Filed: Nov. 1, 2017

(86) PCT No.: PCT/JP2017/039513
§ 371 (c)(1),
(2) Date: May 8, 2019

(87) PCT Pub. No.: WO2018/088296
PCT Pub. Date: May 17, 2018

(65) Prior Publication Data
US 2020/0056695 A1   Feb. 20, 2020

(30) Foreign Application Priority Data
Nov. 9, 2016  (JP) .............................. JP2016-218851

(51) Int. Cl.
*F16H 57/00*  (2012.01)
*F16H 57/04*  (2010.01)
*F16H 61/00*  (2006.01)
*F16H 61/02*  (2006.01)

(52) U.S. Cl.
CPC ..... *F16H 57/0446* (2013.01); *F16H 57/0473* (2013.01); *F16H 61/0021* (2013.01);
(Continued)

(58) Field of Classification Search
CPC ............ F16H 57/0446; F16H 57/0473; F16H 61/0021; F16H 61/0265; F16H 2061/0037;
(Continued)

(56) References Cited

U.S. PATENT DOCUMENTS 3,220,392 A * 11/1965 Cummins ............. F01L 13/065
                                                            123/321
6,199,441 B1    3/2001 Kanenobu et al.
(Continued)

FOREIGN PATENT DOCUMENTS

CN    103562598 A     2/2014
DE    102013001928 A1  8/2014
(Continued)

*Primary Examiner* — Victor L MacArthur
(74) *Attorney, Agent, or Firm* — Alleman Hall Creasman & Tuttle LLP

(57) ABSTRACT

A hydraulically actuated transmission includes a selecting switching valve configured to selectively switch between a first switching valve and a second switching valve as a valve to be connected with an outlet port of a solenoid valve. The selecting switching valve is configured to operate in response to a hydraulic pressure applied to a specific frictional coupling element (second brake) in accordance with coupling and releasing of the specific frictional coupling element, and is configured to connect the outlet port with the first switching valve while the hydraulically actuated transmission is in high gear which is higher than or equal to a predetermined gear, and connect the outlet port with the
(Continued)

second switching valve while the hydraulically actuated transmission is in the low gear which is lower than the predetermined gear.

5 Claims, 6 Drawing Sheets

(52) U.S. Cl.
CPC .. *F16H 61/0265* (2013.01); *F16H 2061/0037* (2013.01); *F16H 2200/006* (2013.01); *F16H 2200/2012* (2013.01); *F16H 2200/2043* (2013.01)

(58) Field of Classification Search
CPC ....... F16H 2200/006; F16H 2200/2012; F16H 2200/2043
See application file for complete search history.

(56) References Cited

U.S. PATENT DOCUMENTS

| | | |
|---|---|---|
| 2008/0234903 A1 | 9/2008 | Satou |
| 2011/0125360 A1 | 5/2011 | Kariya et al. |
| 2012/0247106 A1 | 10/2012 | Noda et al. |
| 2012/0247911 A1 | 10/2012 | Noda et al. |
| 2012/0252631 A1* | 10/2012 | Saji .................. F16H 61/12 477/115 |
| 2013/0112030 A1 | 5/2013 | Feldt et al. |
| 2014/0245731 A1 | 9/2014 | Kutsubo et al. |
| 2014/0291101 A1 | 10/2014 | Schuller et al. |
| 2015/0000441 A1 | 1/2015 | Brushkivskyy et al. |
| 2016/0109019 A1 | 4/2016 | Saji et al. |
| 2019/0271388 A1* | 9/2019 | Ishiyama ............ F16H 61/0021 |
| 2020/0056694 A1* | 2/2020 | Ishiyama ................ F16H 57/04 |

FOREIGN PATENT DOCUMENTS

| | | |
|---|---|---|
| JP | 2002181173 A | 6/2002 |
| JP | 2004156680 A | 6/2004 |
| JP | 2009127719 A | 6/2009 |
| JP | 2011106656 A | 6/2011 |
| JP | 2012215246 A | 11/2012 |
| JP | 2014234879 A | 12/2014 |

* cited by examiner

|  | FIRST GEAR | SECOND GEAR | THIRD GEAR | FOURTH GEAR | FIFTH GEAR | SIXTH GEAR | SEVENTH GEAR | EIGHTH GEAR | REVERSE GEAR |
|---|---|---|---|---|---|---|---|---|---|
| CL1 | ○ |  | ○ |  | ○ | ○ | ○ |  |  |
| CL2 |  | ○ | ○ | ○ |  | ○ |  | ○ |  |
| CL3 |  |  |  | ○ | ○ | ○ | ○ | ○ | ○ |
| BR1 | ○ | ○ |  |  |  |  | ○ | ○ | ○ |
| BR2 | ○ | ○ | ○ | ○ | ○ |  |  |  | ○ |

HYDRAULICALLY ACTUATED TRANSMISSION

TECHNICAL FIELD

The present invention relates to a hydraulically actuated transmission installed in a vehicle.

BACKGROUND ART

A typical hydraulically actuated transmission usually includes a lubricant oil supplying circuit for supplying lubricant oil to a to-be-lubricated portion in the hydraulically actuated transmission. The amount of lubricant oil required in the to-be-lubricated portion varies depending on the operating conditions of the hydraulically actuated transmission. A large amount of lubricant oil is required in some cases, and only a small amount is required in other cases. According to Patent Document 1, a continuous oil supply passage and a demand-based oil supply passage are provided to supply lubricant oil to a to-be-lubricated portion in a hydraulically actuated transmission. The continuous oil supply passage is for constantly supplying the lubricant oil. The demand-based oil supply passage is blocked when a small amount of lubricant oil is required in the to-be-lubricated portion, and is otherwise opened. In this manner, an appropriate amount of lubricant oil is supplied to the to-be-lubricated portion depending on situations. Particularly, in Patent Document 1, a supply mode for supplying the lubricant oil to the to-be-lubricated portion is switched according to whether the transmission is in the first gear or in the second or higher gear, by using two switching valves. The two switching valves are operated by two ON/OFF solenoid valves, respectively.

CITATION LIST

Patent Document

Patent Document 1: Japanese Unexamined Patent Publication No. 2002-181173

SUMMARY OF THE INVENTION

Technical Problem

The amount of lubricant oil required in the to-be-lubricated portion differs depending on whether the hydraulically actuated transmission is in high gear (predetermined or higher gear) or in low gear (lower than the predetermined gear). However, there are situations in which a large amount of lubricant oil is required in the to-be-lubricated portion and in which a small amount of lubricant oil is required in the to-be-lubricated portion, in both of the cases in which the transmission is the high gear and in the low gear.

To address this issue, the supply mode for supplying the lubricant oil to the to-be-lubricated portion may be switched for each of situations in which the transmission in the high gear and in which the transmission is in the low gear. To this end, a first switching valve and a second switching valve are provided. The first switching valve is configured to switch the supply mode for supplying the lubricant oil to the to-be-lubricated portion while the transmission is in the high gear. The second switching valve is configured to switch the supply mode for supplying the lubricant oil to the to-be-lubricated portion while the transmission is in the low gear. However, such a configuration may increase costs if two ON/OFF solenoid valves are required, as in Patent Document 1, to operate the first switching valve and the second switching valve in order to switch the supply modes.

In view of the foregoing, it is an object of the present invention to provide a hydraulically actuated transmission capable of switching a supply mode for supplying a lubricant oil to a to-be-lubricated portion in each of situations in which the transmission is in high gear and the transmission is in low gear, using a simple and low-cost structure.

Solution to the Problem

To achieve the object described above, the present invention is directed to a hydraulically actuated transmission installed in a vehicle. The hydraulically actuated transmission includes: a lubricant oil supplying circuit configured to supply a lubricant oil to a to-be-lubricated portion in the hydraulically actuated transmission; a first switching valve provided at the lubricant oil supplying circuit, and configured to switch a supply mode for supplying the lubricant oil to the to-be-lubricated portion while the hydraulically actuated transmission is in high gear which is higher than or equal to a predetermined gear; a second switching valve provided at the lubricant oil supplying circuit, and configured to switch the supply mode for supplying the lubricant oil to the to-be-lubricated portion while the hydraulically actuated transmission is in low gear which is lower than the predetermined gear; a solenoid valve capable of achieving the switching of the supply mode by switching between supplying and not supplying the lubricant oil to the first switching valve and the second switching valve; a selecting switching valve configured to selectively switch between the first switching valve and the second switching valve as a valve to be connected with an outlet port of the solenoid valve outputting the hydraulic oil; and a specific frictional coupling element, coupling and releasing of which are switched between when the hydraulically actuated transmission is in the high gear and when the hydraulically actuated transmission is in the low gear. The selecting switching valve is configured to operate in response to a hydraulic pressure applied to the specific frictional coupling element in accordance with the coupling and the releasing of the specific frictional coupling element, and is configured to connect the outlet port with the first switching valve while the hydraulically actuated transmission is in the high gear, and connect the outlet port with the second switching valve while the hydraulically actuated transmission is in the low gear.

With the structure described above, the selecting switching valve connects the outlet port of the solenoid valve with the first switching valve when the hydraulically actuated transmission is in the high gear. Thus, the solenoid valve allows the first switching valve to switch the supply mode for supplying the lubricant oil to the to-be-lubricated portion. The selecting switching valve connects the outlet port of the solenoid valve to the second switching valve when the gear position is in the low gear. Thus, the solenoid valve allows the second switching valve to switch the supply mode for supplying the lubricant oil to the to-be-lubricated portion. The selecting switching valve is configured to operate in response to a hydraulic pressure applied to the specific frictional coupling element in accordance with the coupling and the releasing of the specific frictional coupling element, and automatically switch between the valves as a valve to be connected with the outlet port of the solenoid valve. Thus, a solenoid valve which operates the selecting switching valve is not necessary. This means that it is possible to switch, with a single solenoid valve, between supply modes for supplying the lubricant oil to the to-be-lubricated portion in each of the times when the transmission is in the high gear and when the transmission is in the low gear.

According to an embodiment of the hydraulically actuated transmission, the lubricant oil supplying circuit includes a reducing valve configured to reduce a pressure of the lubricant oil having a predetermined pressure and output the lubricant oil with a reduced pressure. The lubricant oil supplying circuit includes a first path for supplying the lubricant oil flowing from the reducing valve to the to-be-lubricated portion sequentially through an oil warmer and an oil cooler, and a second path for supplying the lubricant oil flowing from the reducing valve to the to-be-lubricated portion through the oil cooler, while bypassing the oil warmer. The first switching valve is configured to selectively switch between the first path and the second path in accordance with the supplying and not supplying the lubricant oil by the solenoid valve to the first switching valve while the hydraulically actuated transmission is in the high gear. The reducing valve is configured to make an output pressure of the lubricant oil output from the reducing valve higher when the second path is selected by the first switching valve, than when the first path is selected by the first switching valve.

With this configuration, while the hydraulically actuated transmission is in the high gear, the output pressure of the lubricant oil output from the reducing valve is higher when the second path is selected by the first switching valve, than when the first path is selected by the first switching valve. Therefore, a larger amount of the lubricant oil is supplied to the to-be-lubricated portion when, for example, the lubricant oil temperature (or the load of the hydraulically actuated transmission) is high, than when the lubricant oil temperature (the load) is low. Moreover, by setting the output pressure of the lubricant oil output when the lubricant oil temperature (the load) is high to be the highest possible output pressure, a sufficient amount of lubricant oil can be supplied to the to-be-lubricated portion when the lubricant oil temperature (the load) is high. By contrast, when the lubricant oil temperature (the load) is low, a smaller amount of lubricant oil is supplied to the to-be-lubricated portion, so that it is possible to reduce energy loss which occurs due to stirring of the lubricant oil by a rotating member or the like at the to-be-lubricated portion. Hence, the first switching valve can easily switch the supply mode for supplying the lubricant oil to the to-be-lubricated portion while the transmission is in the high gear.

According to another embodiment of the hydraulically actuated transmission, the lubricant oil supplying circuit includes a large-diameter orifice-installed oil passage and a small-diameter orifice-installed oil passage connected to each other in parallel and provided with a large-diameter orifice and a small-diameter orifice, respectively, which have orifice diameters different from each other. The second switching valve is configured to selectively switch, while the hydraulically actuated transmission is in the low gear, between a first state in which the lubricant oil is supplied to the to-be-lubricated portion at least via the large-diameter orifice-installed oil passage, and a second state in which the lubricant oil is supplied to the to-be-lubricated portion only via the small-diameter orifice-installed oil passage, in accordance with the supplying and not supplying the hydraulic oil to the second switching valve by the solenoid valve.

With this configuration, while the hydraulically actuated transmission is in the low gear, a larger amount of lubricant oil is supplied to the to-be-lubricated portion when the second switching valve is in the first state, and a smaller amount of lubricant oil is supplied to the to-be-lubricated portion when the second switching valve is in the second state. Hence, the second switching valve can easily switch the supply mode for supplying the lubricant oil to the to-be-lubricated portion while the transmission is in the low gear.

In the case in which the second switching valve is configured to selectively switch between the first state and the second state as described above, the lubricant oil supplying circuit further includes a large-diameter orifice-installed oil passage and a small-diameter orifice-installed oil passage arranged between the oil cooler and the to-be-lubricated portion, connected to each other in parallel, and provided with a large-diameter orifice and a small-diameter orifice, respectively, which have orifice diameters different from each other. The second switching valve is configured to selectively switch, while the hydraulically actuated transmission is in the low gear, between a first state in which the lubricant oil is supplied to the to-be-lubricated portion at least via the large-diameter orifice-installed oil passage, and a second state in which the lubricant oil is supplied to the to-be-lubricated portion only via the small-diameter orifice-installed oil passage, in accordance with the supplying and not supplying the hydraulic oil to the second switching valve by the solenoid valve. The first switching valve is configured to select the first path while the hydraulically actuated transmission is in the low gear, and the second switching valve is configured to be in the first state when the hydraulically actuated transmission is in the high gear.

In general, while the hydraulically actuated transmission is in the high gear, quite a large amount of lubricant oil needs to be supplied to the to-be-lubricated portion when it comes to a situation in which the transmission requires a large amount of lubricant oil. In view of this, according to the above configuration, the second switching valve not connected to the outlet port of the solenoid valve is switched to the first state, thereby making it possible to supply a largest possible amount of the lubricant oil to the to-be-lubricated portion. On the other hand, while the transmission is in the low gear, even in a situation in which a large amount of lubricant oil is necessary, not as much lubricant oil as that required when the transmission requires a large amount of lubricant oil while the transmission is in the high gear needs to be supplied to the to-be-lubricated portion. It is therefore possible to reduce energy loss which occurs due to stirring of the lubricant oil by a rotating member or the like at the to-be-lubricated portion, by selecting the first path through the operation of the first switching valve not connected to the output port of the solenoid valve.

Advantages of the Invention

As explained above, according to a hydraulically actuated transmission of the present invention, a selecting switching valve is configured to selectively switch between a first switching valve and a second switching valve as a valve to be connected with an outlet port of a solenoid valve, and is configured to operate in response to a hydraulic pressure applied to a specific frictional coupling element in accordance with coupling and releasing of the specific frictional coupling element. The selecting switching valve connects the outlet port with the first switching valve while the hydraulically actuated transmission is in high gear which is equal to or higher than a predetermined gear, and connects the outlet port with the second switching valve when the hydraulically actuated transmission is in the low gear which is lower than the predetermined gear. It is therefore possible to switch a supply mode for supplying the lubricant oil to the to-be-lubricated portion in each of times when the hydraulically actuated transmission is in the high gear and when the hydraulically actuated transmission is in the low gear, using a simple and low-cost structure.

DESCRIPTION OF EMBODIMENTS

An exemplary embodiment will be described in detail below with reference to the drawings.

Figures 1, 2:
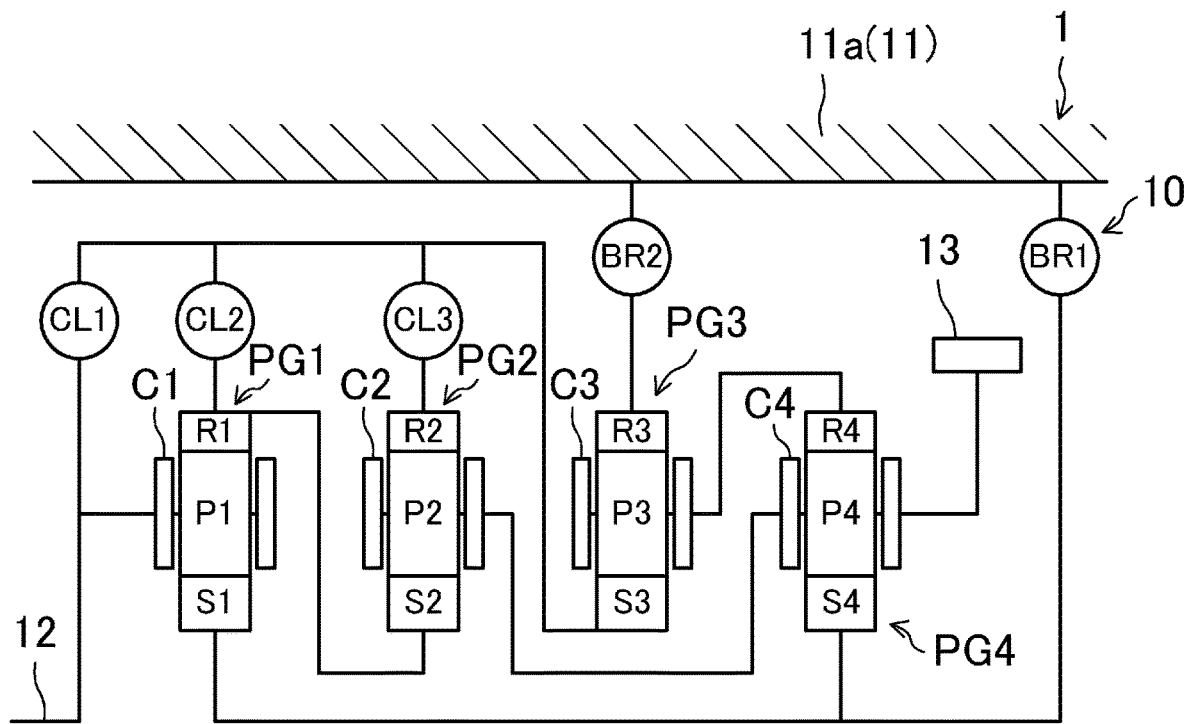
FIG. 1 is a schematic illustrating an outline of a hydraulically actuated transmission according to an exemplary embodiment.
FIG. 2 is a coupling table indicating frictional coupling elements that are coupled in each transmission gear of the hydraulically actuated transmission.

FIG. 1 illustrates a hydraulically actuated transmission 1 (hereinafter, referred to as a transmission 1) according to the exemplary embodiment. The transmission 1 is an automatic transmission installed in a vehicle, and achieving eight forward speeds and one reverse speed. The transmission 1 includes a tubular transmission casing 11, and a transmission mechanism 10 which is installed inside the transmission casing 11, and which receives driving power from a driving source not illustrated. The driving source is an engine in this embodiment, but the driving source may be a motor.

The transmission mechanism 10 includes an input shaft 12 corresponding to an input unit of the transmission 1, and an output gear 13 corresponding to an output unit of the transmission 1. The input shaft 12 is connected directly to the output shaft of the driving source. In other words, in this embodiment, there is no torque converter provided between the output shaft of the driving source and the input shaft 12 of the transmission 1. In this embodiment, the driving source and the transmission 1 are joined to each other, and installed in the vehicle in an orientation in which the output shaft of the driving source and the input shaft 12 extend along the width direction of the vehicle. The output gear 13 is provided at a portion of the transmission casing 11 on the side (the right side in FIG. 1) opposite to the driving source side.

The driving power is transmitted to the output gear 13, and input to the input gear of a differential mechanism via a counter-shaft input gear and a counter-shaft output gear that are provided on a counter shaft. The counter shaft extends in parallel with the input shaft 12. The driving power is then transmitted to driving wheels (front wheels) of the vehicle via the differential mechanism.

The transmission mechanism 10 also includes a first planetary gear set PG1 (hereinafter, referred to as a first gear set PG1), a second planetary gear set PG2 (hereinafter, referred to as a second gear set PG2), a third planetary gear set PG3 (hereinafter, referred to as a third gear set PG3), and a fourth planetary gear set PG4 (hereinafter, referred to as a fourth gear set PG4) that are aligned in the axial direction of the input shaft 12 (which is also the axial direction of the transmission 1). The first gear set PG1, second gear set PG2, third gear set PG3, and fourth gear set PG4 are arranged between the input shaft 12 and the output gear 13, in the order listed herein, from the driving source side. These gear sets constitute a plurality of paths in which the driving power is transmitted from the input shaft 12 to the output gear 13. The input shaft 12, the output gear 13, and the first to fourth gear sets PG1 to PG4 are coaxially positioned.

The transmission mechanism 10 also includes five frictional coupling elements (a first clutch CL1, a second clutch CL2, a third clutch CL3, a first brake BR1, and a second brake BR2) for selecting and switching to one of the paths formed by the first to fourth gear sets PG1 to PG4 and transmitting the driving power.

The first gear set PG1 includes a first sun gear S1, a first ring gear R1, and a first carrier C1 as rotating elements. The first gear set PG1 is a single-pinion gear set. A plurality of pinions P1 supported by the first carrier C1 are arranged apart from one another along the circumferential direction of the first gear set PG1, and meshed with both of the first sun gear S1 and the first ring gear R1.

The second gear set PG2 includes a second sun gear S2, a second ring gear R2, and a second carrier C2 as rotating elements. The second gear set PG2 is also a single-pinion gear set. A plurality of pinions P2 supported by the second carrier C2 are arranged apart from each other along the circumferential direction of the second gear set PG2, and meshed with both of the second sun gear S2 and the second ring gear R2.

The third gear set PG3 includes a third sun gear S3, a third ring gear R3, and a third carrier C3 as rotating elements. The third gear set PG3 is also a single-pinion gear set. A plurality of pinions P3 supported by the third carrier C3 are arranged apart from each other along the circumferential direction of the third gear set PG3, and meshed with both of the third sun gear S3 and the third ring gear R3.

The fourth gear set PG4 includes a fourth sun gear S4, a fourth ring gear R4, and a fourth carrier C4 as rotating elements. The fourth gear set PG4 is also a single-pinion gear set. A plurality of pinions P4 supported by the fourth carrier C4 are arranged apart from each other along the circumferential direction of the fourth gear set PG4, and meshed with both of the fourth sun gear S4 and the fourth ring gear R4.

The first sun gear S1 and the fourth sun gear S4 remain connected with each other. The first ring gear R1 and the second sun gear S2 remain connected with each other. The second carrier C2 and the fourth carrier C4 remain connected with each other, and the third carrier C3 and the fourth ring gear R4 remain connected with each other. The input shaft 12 remains connected with the first carrier C1.

The output gear 13 remains connected with the second carrier C2 and the fourth carrier C4.

The first clutch CL1 is configured to disconnect the input shaft 12 and the first carrier C1 from the third sun gear S3. The first clutch CL1 is positioned at the end of the driving source side of the transmission casing 11 and near the circumferential wall 11a of the transmission casing 11.

The second clutch CL2 is configured to disconnect the first ring gear R1 and the second sun gear S2 from the third sun gear S3. The second clutch CL2 is positioned on the outer side of the first ring gear R1 in the radial direction and near the circumferential wall 11a of the transmission casing 11.

The third clutch CL3 is configured to disconnect the second ring gear R2 from the third sun gear S3. The third clutch CL3 is positioned on the outer side of the second ring gear R2 in the radial direction and near the circumferential wall 11a of the transmission casing 11.

The first brake BR1 is configured to disconnect the first sun gear S1 and the fourth sun gear S4 from the transmission casing 11. The first brake BR1 is positioned at the end of the side opposite to the driving source side of the transmission casing 11 and near the circumferential wall 11a of the transmission casing 11.

The second brake BR2 is configured to disconnect the third ring gear R3 from the transmission casing 11. The second brake BR2 is positioned on the outer side of the third ring gear R3 in the radial direction and near the circumferential wall 11a of the transmission casing 11.

Each of these frictional coupling elements is coupled when the hydraulic oil is supplied to a coupling hydraulic chamber of the frictional coupling element. As illustrated in a coupling table in FIG. 2, by selectively coupling three out of the five frictional coupling elements, first to eighth forward gears and one reverse gear are formed. In the coupling table illustrated in FIG. 2, circles indicate the frictional coupling elements that are coupled, and blanks indicate the frictional coupling elements that are de-coupled (released).

Specifically, the first gear is formed by coupling the first clutch CL1, the first brake BR1, and the second brake BR2. The second gear is formed by coupling the second clutch CL2, the first brake BR1, and the second brake BR2. The third gear is formed by coupling first clutch CL1, the second clutch CL2, and the second brake BR2. The fourth gear is formed by coupling the second clutch CL2, the third clutch CL3, and the second brake BR2. The fifth gear is formed by coupling the first clutch CL1, the third clutch CL3, and the second brake BR2. The sixth gear is formed by coupling the first clutch CL1, the second clutch CL2, and the third clutch CL3. The seventh gear is formed by coupling the first clutch CL1, the third clutch CL3, and the first brake BR1. The eighth gear is formed by coupling the second clutch CL2, the third clutch CL3, and the first brake BR1. The reverse gear is formed by coupling the third clutch CL3, the first brake BR1, and the second brake BR2. In the sixth gear, the revolving speed of the input shaft 12 is the same as that of the output gear 13.

At the start of the vehicle, the second brake BR2 which has been released is caused to slip and then to become completely coupled, by coupling the first clutch CL1 and the first brake BR1 and thereafter supplying the hydraulic oil to a coupling hydraulic chamber of the second brake BR2. In other words, the second brake BR2 serves as a frictional coupling element for starting a vehicle.

Figure 3:
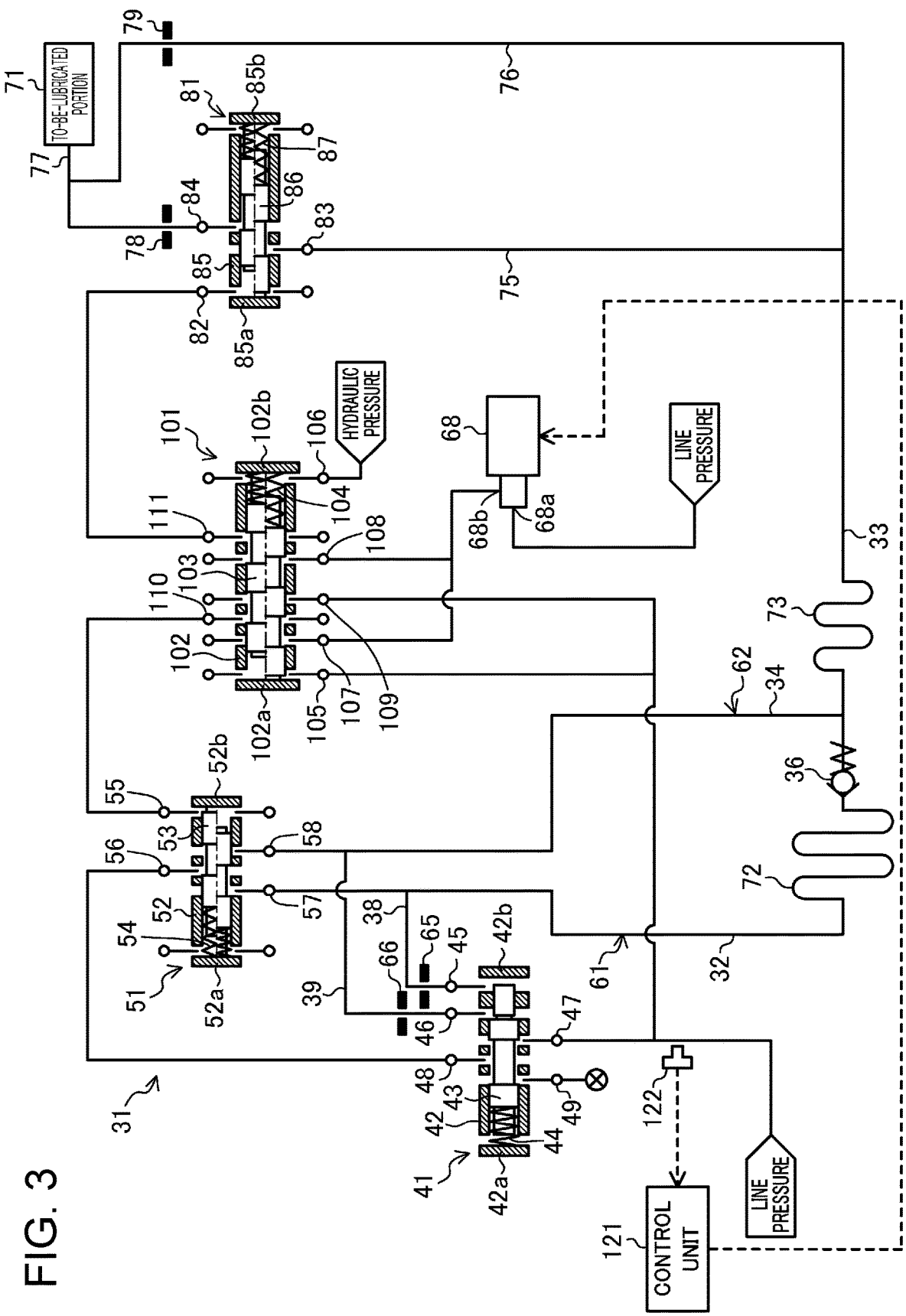
FIG. 3 is a circuit diagram illustrating a part of a lubricant oil supplying circuit included in the hydraulically actuated transmission.

FIG. 3 illustrates a part of a lubricant oil supplying circuit 31 in the transmission 1. The lubricant oil supplying circuit 31 supplies lubricant oil to a to-be-lubricated portion 71 in the transmission 1. In this embodiment, the to-be-lubricated portion 71 is, for example, a bearing or a bush, not illustrated, which supports the input shaft 12, the first to the fourth gear sets PG1 to PG4, or frictional coupling elements (particularly friction plates) other than the second brake BR2. The second brake BR2, when slipping at the start of the vehicle, requires a very large amount of lubricant oil. Thus, in the present embodiment, the lubricant oil is supplied through a lubricant oil supplying circuit (not illustrated) provided independently of the lubricant oil supplying circuit 31. The transmission 1 also includes a hydraulic oil supplying circuit for supplying hydraulic oil to each of the frictional coupling elements so as to couple and/or release the frictional coupling elements. The hydraulic oil and the lubricant oil are oil discharged from an oil pump not illustrated.

A reducing valve 41 is provided at the lubricant oil supplying circuit 31. The reducing valve 41 reduces the pressure of the lubricant oil having a predetermined pressure and outputs the resultant lubricant oil. In this embodiment, the predetermined pressure is a line pressure. In this example, the line pressure is a pressure of the hydraulic oil discharged from the oil pump and regulated by a regulator valve (not illustrated), and serves as the source pressure of the entire hydraulic oil and lubricant oil that are required in the transmission 1. The predetermined pressure may be any pressure equal to or lower than the line pressure, but it is preferable that the predetermined pressure be as high as possible so that a required output pressure is achieved even after the pressure is reduced.

The reducing valve 41 includes a spool 43 housed in a sleeve 42. The spool 43 is movable between a first position where the spool 43 abuts against an end wall 42a on one end of the sleeve 42 (the end wall on the left side in FIG. 3) and a second position where the spool 43 abuts against an end wall 42b on the other end of the sleeve 42 (the end wall on the right side in FIG. 3) in the axial direction of the spool 43. A first regulation port 45 is provided on the other end of the sleeve 42 where the second position is located. Part of the lubricant oil in a first path 61, which will be described later, is input to the first regulation port 45. A second regulation port 46 is also provided at a position of the sleeve 42 which is adjacent to the first regulation port 45 and on the side toward the first position with respect to the first regulation port 45.

The spool 43 is pressed toward the one end (toward the first position) in the axial direction of the spool 43 by the lubricant oil input to the first regulation port 45 or the second regulation port 46. The spool 43 is biased toward the other end (toward the second position) in the axial direction of the spool 43 by a compressed coil spring 44 provided in the sleeve 42 on the one end of the spool 43 where the first position is located.

The sleeve 42 also includes an inlet port 47 to which the lubricant oil at the predetermined pressure (line pressure) is input, an outlet port 48 from which the lubricant oil having a pressure reduced from the line pressure is output, and a drain port 49 from which surplus lubricant oil that is not output from the outlet port 48 is drained.

An output pressure at which the lubricant oil is output from the outlet port 48 is determined according to a magnitude relationship between the biasing force of the compressed coil spring 44 and the pressing force toward the spool 43 which is converted from the pressure of the lubricant oil input to the first regulation port 45 or the second regulation port 46.

In the case in which the lubricant oil is input to the first regulation port 45, the pressure of the lubricant oil input to the first regulation port 45 is equal to the output pressure of the lubricant oil output from the outlet port 48. If the output pressure is high, the pressure of the lubricant oil input to the first regulation port 45 is also high. As a result, the spool 43 is moved to the first position, which increases the amount of lubricant oil drained and decreases the output pressure. By contrast, if the output pressure is low, the pressure of the lubricant oil input to the first regulation port 45 is also low. As a result, the spool 43 is moved to the second position, which reduces the amount of lubricant oil drained and increases the output pressure. In this manner, the spool 43 stabilizes at a position determined by the magnitude relationship between the biasing force of the compressed coil spring 44 and the pressing force toward the spool 43 which is converted from the pressure of the lubricant oil input to the first regulation port 45. The output pressure is maintained at a constant value corresponding to that position.

In the case in which the lubricant oil is input to the second regulation port 46, the pressure of the lubricant oil input to the second regulation port 46 is equal to the output pressure of the lubricant oil from the outlet port 48. The output pressure is maintained at a constant value, similarly to when the lubricant oil is input to the first regulation port 45.

In the case in which the lubricant oil is input to the second regulation port 46, the spool 43 stabilizes at the same position as when the lubricant oil is input to the first regulation port 45 if the area of the spool 43 pressed toward the first position by the lubricant oil input to the second regulation port 46 is equal to the area of the spool 43 pressed toward the first position by the lubricant oil input to the first regulation port 45. This means that the output pressure at the time when the lubricant oil is input to the second regulation port 46 is equal to the output pressure at the time when the lubricant oil is input to the first regulation port 45.

However, in this embodiment, the area of the spool 43 pressed toward the first position by the lubricant oil input to the second regulation port 46 is smaller than the area of the spool 43 pressed toward the first position by the lubricant oil input to the first regulation port 45. Therefore, the pressing force applied to the spool 43 by the lubricant oil input to the second regulation port 46 is smaller than the pressing force applied to the spool 43 by the lubricant oil input to the first regulation port 45. Thus, the spool 43 stabilizes at a position closer to the second position when the lubricant oil is input to the second regulation port 46, than when the lubricant oil is input to the first regulation port 45. Therefore, the output pressure at the time when the lubricant oil is input to the second regulation port 46 is smaller than the output pressure at the time when the lubricant oil is input to the first regulation port 45.

The lubricant oil supplying circuit 31 includes a first path 61 and a second path 62. In the first path 61, the lubricant oil output from the outlet port 48 of the reducing valve 41 passes through the oil warmer 72 and the oil cooler 73, in the order listed herein, to be supplied to the to-be-lubricated portion 71. In the second path 62, the lubricant oil output from the outlet port 48 of the reducing valve 41 bypasses the oil warmer 72 and passes through the oil cooler 73 to be supplied to the to-be-lubricated portion 71. The oil warmer 72 is a heat exchanger in which heat is exchanged between the cooling water for cooling the driving source (in this embodiment, engine-cooling water) and the lubricant oil. The oil cooler 73 is a heat exchanger in which heat is exchanged between drive airflow generated by a running vehicle and the lubricant oil.

The first path 61 includes an oil warmer passage 32 provided with the oil warmer 72, and an oil cooler passage 33 connected in series with the oil warmer passage 32 and provided with the oil cooler 73. The oil cooler passage 33 is positioned downstream of the oil warmer passage 32 (toward the to-be-lubricated portion 71).

The second path 62 includes a bypass oil passage 34 that bypasses the oil warmer 72, and the oil cooler passage 33. The downstream end of the bypass oil passage 34 is connected to the downstream end of the oil warmer passage 32 (to the upstream end of the oil cooler passage 33). A check valve 36 is provided near the downstream end of the oil warmer passage 32, and prevents the lubricant oil flowing through the bypass oil passage 34 from going into the oil warmer 72.

In this embodiment, as will be described later, a large-diameter orifice-installed oil passage 75 and a small-diameter orifice-installed oil passage 76, which are connected to each other in parallel, are provided between the oil cooler 73 (the oil cooler passage 33) and the to-be-lubricated portion 71. Thus, the lubricant oil which has passed through the oil cooler 73 (the oil cooler passage 33) is supplied to the to-be-lubricated portion 71 via the large-diameter orifice-installed oil passage 75 and/or the small-diameter orifice-installed oil passage 76.

A first connecting oil passage 38 branches off from a portion of the oil warmer passage 32 upstream of the oil warmer 72, and is connected to the first regulation port 45 of the reducing valve 41. With this configuration, part of the lubricant oil flowing through the first path 61 upstream of the oil warmer 72 and the oil cooler 73 is input to the first regulation port 45.

A second connecting oil passage 39 branches off from the bypass oil passage 34, and is connected to the second regulation port 46 of the reducing valve 41. With this configuration, part of the lubricant oil flowing through the second path 62 upstream of the oil cooler 73 is input to the second regulation port 46.

Orifices 65 and 66 are provided at the first connecting oil passage 38 and the second connecting oil passage 39, respectively. The orifices 65 and 66 are intended to prevent oil vibrations on the upstream side of the orifices 65 and 66 from being transmitted to the downstream side of the orifices 65 and 66 (to the first regulation port 45 and the second regulation port 46). The orifices 65 and 66 have a very small orifice diameter.

The lubricant oil supplying circuit 31 is provided with a first switching valve 51 configured to selectively switch between the first path 61 and the second path 62 as the path for supplying the lubricant oil from the reducing valve 41 to the to-be-lubricated portion 71. The first switching valve 51 is a switching valve configured to switch between supply modes for supplying the lubricant oil from the reducing valve 41 to the to-be-lubricated portion 71 (the supply path leading to the to-be-lubricated portion 71) while the transmission 1 is in high gear which is higher than or equal to a predetermined gear (sixth gear in this embodiment).

The first switching valve 51 includes a spool 53 housed inside of a sleeve 52. This spool 53 is movable between a first position where the spool 53 abuts against an end wall 52a on one end of the sleeve 52 (the end wall on the left side in FIG. 3), and a second position where the spool 53 abuts against an end wall 52b on the other end of the sleeve 52 (the end wall on the right side in FIG. 3) in the axial direction of the spool 53. A compressed coil spring 54 for biasing the spool 53 toward the second position is provided at the one end of the sleeve 52 where the first position is located.

A control port 55 connected to a port 110 of a selecting switching valve 101, which will be described later, is provided at the other end of the sleeve 52 where the second position is located. Hydraulic oil at the line pressure is supplied, or not supplied at all, to this control port 55. When the hydraulic oil at the line pressure is supplied to the control port 55, the spool 53 moves to the first position against the biasing force of the compressed coil spring 54. On the other hand, when the hydraulic oil is not supplied to the control port 55 at all, the spool 53 is located at the second position due to the biasing force of the compressed coil spring 54.

The sleeve 52 also includes an inlet port 56 to which the lubricant oil from the reducing valve 41 is input, a first outlet port 57 connected to the first path 61 (an oil warmer passage 32), and a second outlet port 58 connected to the second path 62 (a bypass oil passage 34).

When the spool 53 is located at the first position, the inlet port 56 communicates with the first outlet port 57. When the spool 53 is located at the second position, the inlet port 56 communicates with the second outlet port 58. In this manner, the first switching valve 51 is capable of selectively switching between a first state in which the inlet port 56 communicates with the first outlet port 57, and a second state in which the inlet port 56 communicates with the second outlet port 58.

The first switching valve 51 in the first state allows the first path 61 to serve as the path for supplying the lubricant oil from the reducing valve 41 to the to-be-lubricated portion 71. The first switching valve 51 in the second state allows the second path 62 to serve as the path for supplying the lubricant oil from the reducing valve 41 to the to-be-lubricated portion 71.

While the first switching valve 51 is in the first state, the lubricant oil from the reducing valve 41 flows out of the first outlet port 57 of the first switching valve 51, and flows into the first path 61. At this time, part of the lubricant oil flowing through the oil warmer passage 32 upstream of the oil warmer 72 is input to the first regulation port 45 of the reducing valve 41 via the first connecting oil passage 38. As a result, as described above, the output pressure of the lubricant oil output from the outlet port 48 of the reducing valve 41 is maintained at a constant value (hereinafter, this constant value will be referred to as a first pressure).

While the first switching valve 51 is in the second state, the lubricant oil from the reducing valve 41 flows out of the second outlet port 58 of the first switching valve 51, and flows into the second path 62. At this time, part of the lubricant oil flowing through the bypass oil passage 34 is input to the second regulation port 46 of the reducing valve 41 via the second connecting oil passage 39. As a result, the output pressure of the lubricant oil output from the outlet port 48 of the reducing valve 41 is maintained at a constant value that is higher than the first pressure (hereinafter, this constant value will be referred to as a second pressure).

The lubricant oil supplying circuit 31 further includes the large-diameter orifice-installed oil passage 75 and the small-diameter orifice-installed oil passage 76 arranged between the oil cooler 73 and the to-be-lubricated portion 71 and connected to each other in parallel. The large-diameter orifice-installed oil passage 75 and the small-diameter orifice-installed oil passage 76 are provided with a large-diameter orifice 78 and a small-diameter orifice 79, respectively, which have diameters different from each other. With this configuration, a flow rate of the lubricant oil flowing through the large-diameter orifice-installed oil passage 75 is greater than a flow rate flowing through the small-diameter orifice-installed oil passage 76.

The large-diameter orifice-installed oil passage 75 and the small-diameter orifice-installed oil passage 76 receive the lubricant oil which has passed through the oil cooler 73 (the oil cooler passage 33). The downstream ends of the large-diameter orifice-installed oil passage 75 and the small-diameter orifice-installed oil passage 76 are merged with each other into a merged oil passage 77, and the lubricant oil is supplied to the to-be-lubricated portion 71 via this merged oil passage 77.

The lubricant oil supplying circuit 31 also includes a second switching valve 81 configured to switch the supply mode for supplying the lubricant oil from the oil cooler 73 to the to-be-lubricated portion 71 when the transmission 1 is in low gear (including the reverse gear in this embodiment) which is lower than the predetermined gear (the sixth gear). In this embodiment, the second switching valve 81 is provided at the large-diameter orifice-installed oil passage 75. The large-diameter orifice-installed oil passage 75 is connected to two ports 83 and 84 of the second switching valve 81 at upstream and downstream portions thereof, respectively. The upstream and downstream portions communicate with each other, or are blocked from each other, by the operation of the second switching valve 81.

The second switching valve 81 includes a spool 86 housed inside of a sleeve 85. This spool 86 is movable between a first end where the spool 86 abuts against one end wall 85a of the sleeve 85 (the left end wall in FIG. 3), and a second end where the spool 86 abuts against the other end wall 85b of the sleeve 85 (the right end wall in FIG. 3), in the axial direction of the spool 86. A compressed coil spring 87 for applying a biasing force to the spool 86 toward the first end is provided to the second end inside of the sleeve 85.

A control port 82 is provided at the one end of the sleeve 85 where the first position is located. The control port 82 is connected to a port 111 of the selecting switching valve 101, which will be described later. The hydraulic oil at the line pressure is supplied, or not supplied at all, to this control port 82. When the hydraulic oil at the line pressure is supplied to the control port 82, the spool 86 is moved to the second position against the biasing force of the compressed coil spring 87. When the hydraulic oil is not supplied to the control port 82 at all, the spool 86 is located at the first position due to the biasing force of the compressed coil spring 87.

When the spool 86 of the second switching valve 81 is located at the first position, the two ports 83 and 84 communicate with each other. As a result, the upstream portion and the downstream portion of the large-diameter orifice-installed oil passage 75 communicate with each other (the large-diameter orifice-installed oil passage 75 is open). In this manner, when the large-diameter orifice-installed oil passage 75 is open, the lubricant oil from the oil cooler 73 is supplied to the to-be-lubricated portion 71 via both of the large-diameter orifice-installed oil passage 75 and the small-diameter orifice-installed oil passage 76.

When the spool 86 is located at the second position, the two ports 83 and 84 do not communicate with each other. As a result, the upstream portion and the downstream portion of the large-diameter orifice-installed oil passage 75 are blocked from each other (the large-diameter orifice-installed oil passage 75 is blocked). In this manner, while the large-diameter orifice-installed oil passage 75 is blocked, the lubricant oil from the oil cooler 73 is supplied to the to-be-lubricated portion 71 only via the small-diameter orifice-installed oil passage 76.

In this manner, the second switching valve 81 is capable of selectively switching between the first state in which the lubricant oil from the oil cooler 73 is supplied to the to-be-lubricated portion 71 via both of the large-diameter orifice-installed oil passage 75 and the small-diameter orifice-installed oil passage 76, and the second state in which the lubricant oil from the oil cooler 73 is supplied to the to-be-lubricated portion 71 only via the small-diameter orifice-installed oil passage 76. The second switching valve 81 may also be configured to supply the lubricant oil flowing from the oil cooler 73 to the to-be-lubricated portion 71 only via the large-diameter orifice-installed oil passage 75, while the second switching valve 81 is in the first state.

The lubricant oil supplying circuit 31 also includes an ON/OFF solenoid valve 68 and a selecting switching valve 101. The ON/OFF solenoid valve 68 is capable of achieving the switching of the above-described supply mode by switching between supplying and not supplying the hydraulic oil to the first switching valve 51 and the second switching valve 81. The selecting switching valve 101 selectively switches between the first switching valve 51 and the second switching valve 81 as a valve to be connected with the outlet port 68b of the ON/OFF solenoid valve 68 outputting the hydraulic oil.

Hydraulic oil having a preset pressure is input to the inlet port 68a of the ON/OFF solenoid valve 68. In this embodiment, the preset pressure is the line pressure. The preset pressure may be any pressure equal to or higher than the pressure at which the first switching valve 51 and the second switching valve 81 can be operated, and equal to or lower than the withstand pressure of the ON/OFF solenoid valve 68.

When the ON/OFF solenoid valve 68 is switched ON, the hydraulic oil having the preset pressure (the line pressure) is output from the outlet port 68b as it is. When the ON/OFF solenoid valve 68 is switched OFF, the flow of the hydraulic oil is blocked, so that no hydraulic oil is output from the outlet port 68b.

The selecting switching valve 101 includes a spool 103 housed in a sleeve 102. The spool 103 is movable between a first position where the spool 103 abuts against an end wall 102a on the one end of the sleeve 102 (the end wall on the left side in FIG. 3) and a second position where the spool 103 abuts against an end wall 102b on the other end of the sleeve 102 (the end wall on the right side in FIG. 3) in the axial direction of the spool 103. A compressed coil spring 104 for biasing the spool 103 toward the first position is provided to the other end of the sleeve 102 where the second position is located.

The one end of the sleeve 102 where the first position is located has a first control port 105 to which the hydraulic oil at the line pressure is supplied constantly. The other end of the sleeve 102 where the second position is located has a second control port 106.

The second brake BR2 has a coupling hydraulic chamber and a releasing hydraulic chamber between which a piston is interposed. In coupling the second brake BR2 (that is, when the transmission 1 is in the low gear), the hydraulic oil at the line pressure is supplied to the coupling hydraulic chamber, and the hydraulic oil is drained from the releasing hydraulic chamber. In releasing the second brake BR2 (that is, when the transmission 1 is in the high gear), the hydraulic oil at the line pressure is supplied to the releasing hydraulic chamber, and the hydraulic oil is drained from the coupling hydraulic chamber.

When the hydraulic oil at the line pressure is supplied to the releasing hydraulic chamber, the hydraulic oil at the line pressure is also supplied to the second control port 106. When the hydraulic oil is drained from the releasing hydraulic chamber, no hydraulic oil is supplied to the second control port 106. In other words, the hydraulic oil having the same hydraulic pressure (the line pressure or 0) as the hydraulic oil supplied to the releasing hydraulic chamber of the second brake BR2 is supplied to the second control port 106, in accordance with the coupling and releasing of the second brake BR2. The second brake BR2 corresponds to a specific frictional coupling element, the coupling and releasing of which are switched between when the transmission 1 is in the high gear and the transmission 1 is in the low gear.

As mentioned earlier, the hydraulic oil at the line pressure is supplied constantly to the first control port 105. When the hydraulic oil at the line pressure is supplied to the second control port 106 (when the hydraulic pressure is at the line pressure), that is, when the transmission 1 is in the high gear, the spool 103 is located at the first position due to the biasing force of the compressed coil spring 104. By contrast, when no hydraulic oil is supplied to the second control port 106 (when the hydraulic pressure is 0), that is, when the transmission 1 is in the low gear, the spool 103 is located at the second position.

The sleeve 102 of the selecting switching valve 101 also has two ports 107 and 108 connected to the outlet port 68b of the ON/OFF solenoid valve 68, a port 109 to which the hydraulic oil at the line pressure is supplied constantly, a port 110 connected to the control port 55 of the first switching valve 51, and a port 111 connected to the control port 82 of the second switching valve 81.

When the transmission 1 is in the high gear and the spool 103 of the selecting switching valve 101 is located at the first position, the port 107 communicates with the port 110. As a result, the control port 55 of the first switching valve 51 is connected to the outlet port 68b of the ON/OFF solenoid valve 68, allowing the first switching valve 51 to be switched between the first state and the second state through supplying or not supplying the hydraulic oil to the control port 55 by the ON/OFF solenoid valve 68.

When the transmission 1 is in the high gear and the spool 103 is located at the first position, the port 108 does not communicate with the port 111. As a result, the second switching valve 81 cannot be switched between the first state and the second state by the ON/OFF solenoid valve 68. At this time, the hydraulic oil at the line pressure is not supplied to the control port 82 of the second switching valve 81, and the second switching valve 81 is in the first state.

When the transmission 1 is in the low gear and the spool 103 is located at the second position, the port 108 communicates with the port 111. As a result, the control port 82 of the second switching valve 81 is connected to the outlet port 68b of the ON/OFF solenoid valve 68, allowing the second switching valve 81 to be switched between the first state and the second state through supplying or not supplying the hydraulic oil to the control port 82 by the ON/OFF solenoid valve 68.

When the transmission 1 is in the low gear and the spool 103 is located at the second position, the port 107 does not communicate with the port 110. As a result, the first switching valve 51 cannot be switched between the first state and the second state by the ON/OFF solenoid valve 68. At this time, the port 109 communicates with the port 110. Thus, the hydraulic oil at the line pressure is supplied to the control port 55 of the first switching valve 51, and the first switching valve 51 is in the first state. When the spool 103 is located at the first position, the port 109 does not communicate with the port 110.

In this manner, the selecting switching valve 101 is configured to connect the outlet port 68b of the ON/OFF solenoid valve 68 automatically to the first switching valve 51 when the transmission 1 is in the high gear, and connect the outlet port 68b of the ON/OFF solenoid valve 68 automatically to the second switching valve 81 when the transmission 1 is in the low gear.

The ON/OFF solenoid valve 68 is controlled by a control unit 121. The control unit 121 is a controller using a known microcomputer as a base element, and includes: a central processing unit (CPU) that executes computer programs (including a basic control program such as an operating system (OS), and an application program started on the OS and implements a specific function); a memory which is implemented, for example, as a random access memory (RAM) or a read-only memory (ROM) and which stores the computer programs and data; and an input/output (I/O) bus for inputting and outputting electric signals.

The control unit 121 receives inputs of various types of information allowing the transmission gears of the transmission 1 to be automatically switched based on the driving conditions of the vehicle (e.g., information pertaining to the gear stick range, the accelerator position, and the speed of the vehicle). The control unit 121 also receives inputs of lubricant oil temperature information from a temperature sensor 122 detecting the temperature of the lubricant oil to be supplied to the to-be-lubricated portion 71 (the lubricant oil before passing through the oil warmer 72 and the oil cooler 73). In FIG. 3, the temperature sensor 122 detects the temperature of the lubricant oil upstream of the reducing valve 41, but the temperature sensor 122 may detect the temperature of the lubricant oil downstream of the reducing valve 41 and upstream of the switching valve 51.

The control unit 121 controls the ON/OFF solenoid valve 68 based on the pieces of information received, and controls the valves provided in the hydraulic oil supplying circuit and the lubricant oil supplying circuit leading to the second brake BR2.

While the transmission 1 is in the high gear, the control unit 121 turns the ON/OFF solenoid valve 68 to the ON state when the lubricant oil temperature detected by the temperature sensor 122 is lower than a predetermined temperature (in this embodiment, a temperature referred to as an ultra-low temperature that is quite low among the subfreezing temperatures), whereas the control unit 121 turns the ON/OFF solenoid valve 68 to the OFF state when the lubricant oil temperature detected by the temperature sensor 122 is equal to or higher than the predetermined temperature.

Figure 4:
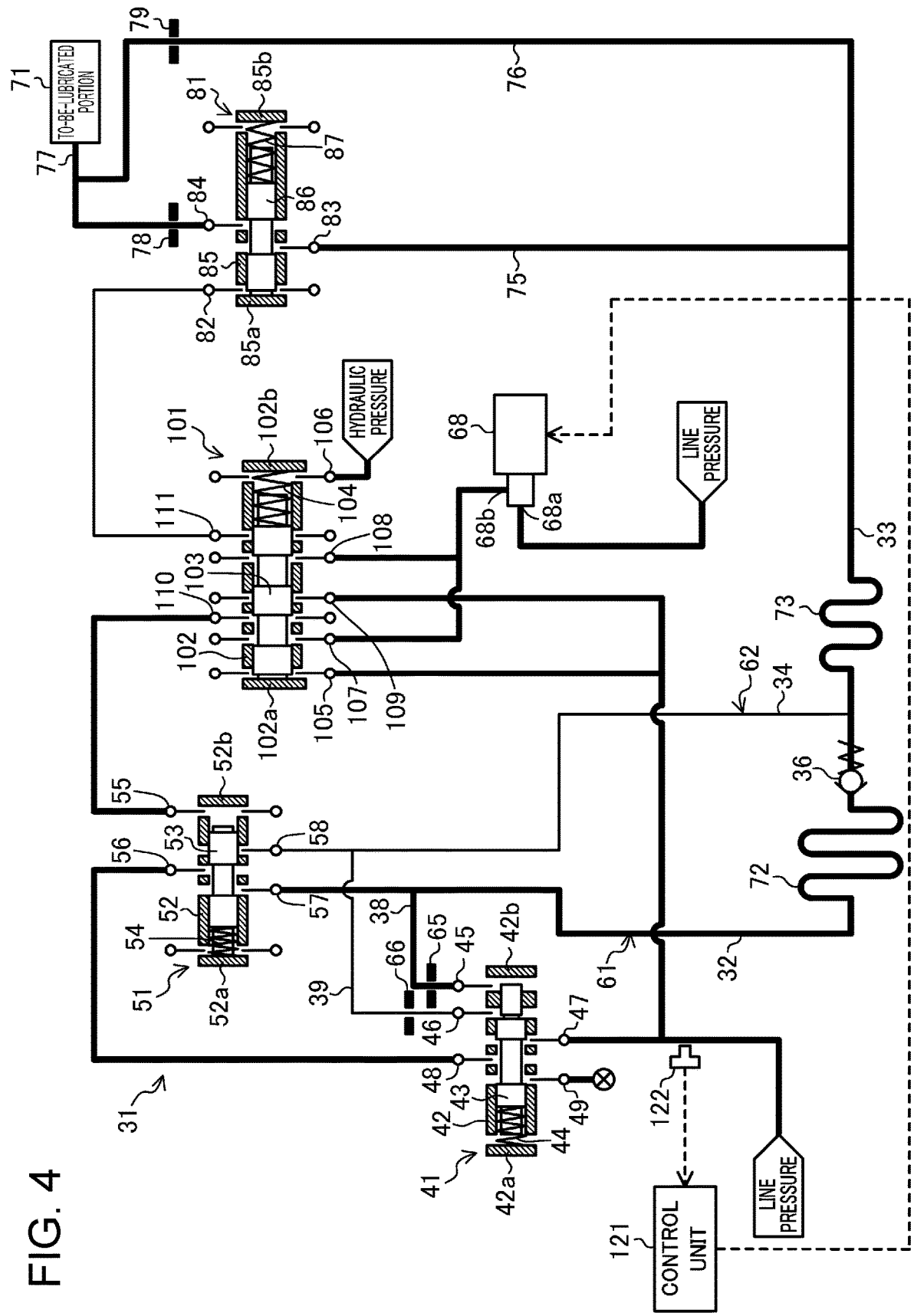
FIG. 4 is a schematic corresponding to FIG. 3, illustrating a condition in which an ON/OFF solenoid valve is switched ON while the hydraulically actuated transmission is in high gear which is higher than or equal to a predetermined gear (while a spool of a selecting switching valve is located at a first position).

If the ON/OFF solenoid valve 68 is switched ON while the gear position of the transmission 1 is in the high gear (while the spool 103 of the selecting switching valve 101 is at the first position), the hydraulic oil at the line pressure is supplied from the outlet port 68b of the ON/OFF solenoid valve 68 to the control port 55 of the first switching valve 51 via the ports 107 and 110 of the selecting switching valve 101, as illustrated in FIG. 4. As a result, the spool 53 of the first switching valve 51 is moved to the first position, and the first switching valve 51 turns to the first state. As a result, the lubricant oil output from the reducing valve 41 and input to the inlet port 56 of the first switching valve 51 flows out of the first outlet port 57 of the first switching valve 51 and flows into the first path 61. At this time, the second switching valve 81 is in the first state. Therefore, if the gear position of the transmission 1 is in the high gear, and the lubricant oil temperature detected by the temperature sensor 122 is lower than the predetermined temperature, the lubricant oil from the reducing valve 41 passes through the oil warmer 72 and the oil cooler 73, passes through both of the large-diameter orifice-installed oil passage 75 and the small-diameter orifice-installed oil passage 76, and is then supplied to the to-be-lubricated portion 71. Thus, the lubricant oil can be warmed by the oil warmer 72 before being supplied to the to-be-lubricated portion 71 when the lubricant oil temperature is lower than the predetermined temperature. In FIGS. 4 to 7, the path through which the hydraulic oil and the lubricant oil flow is indicated by thick lines.

At this time, part of the lubricant oil flowing through the oil warmer passage 32 upstream of the oil warmer 72 is input to the first regulation port 45 of the reducing valve 41 via the first connecting oil passage 38. As a result, as described above, the output pressure of the lubricant oil output from the outlet port 48 of the reducing valve 41 is maintained at the first pressure.

Figure 5:
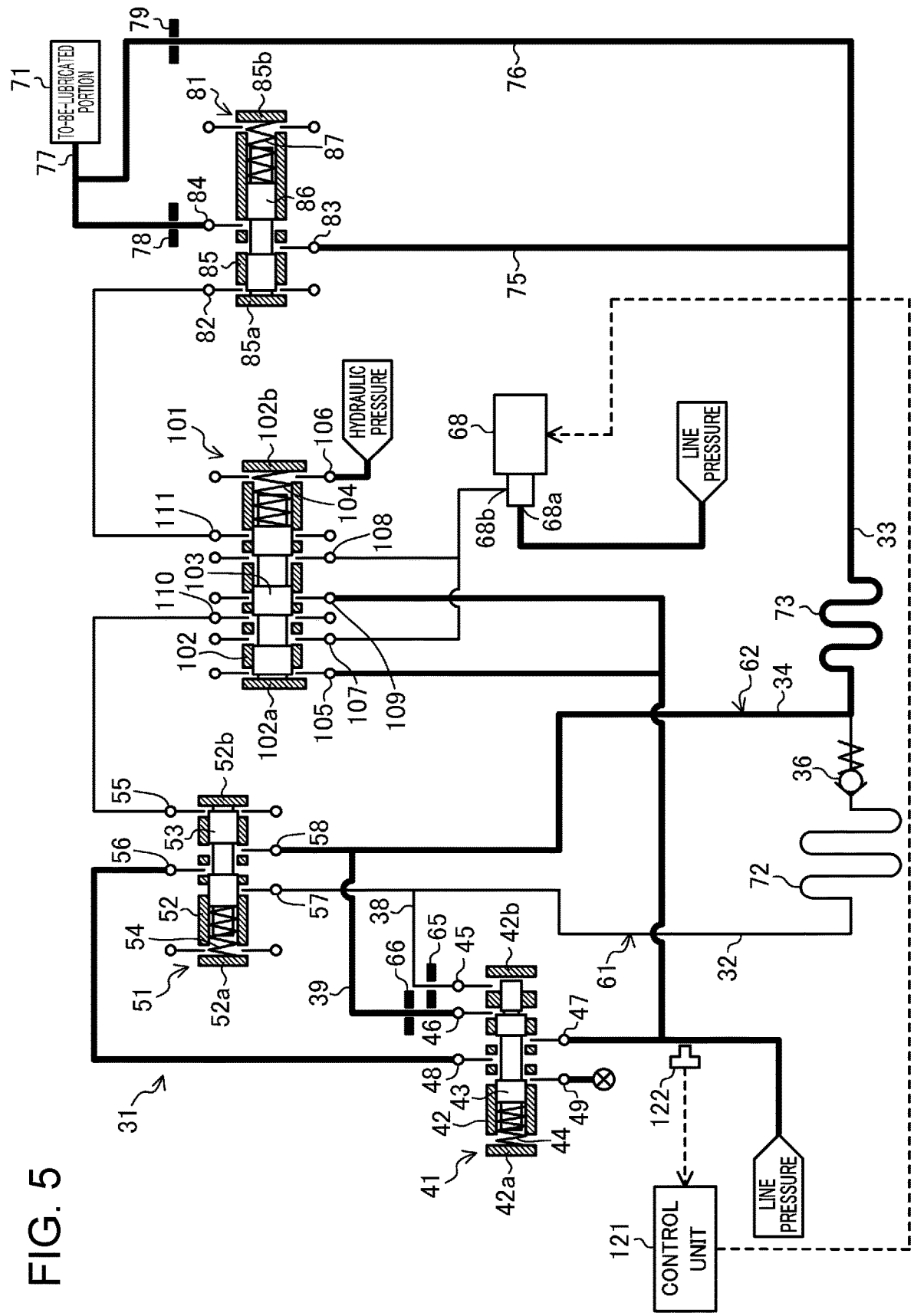
FIG. 5 is a schematic corresponding to FIG. 3, illustrating a condition in which the ON/OFF solenoid valve is switched OFF while the hydraulically actuated transmission is in the high gear (while the spool of the selecting switching valve is located at the first position).

If the ON/OFF solenoid valve 68 is switched OFF while the transmission 1 is in the high gear (while the spool 103 of the selecting switching valve 101 is located at the first position), no hydraulic oil is output from the outlet port 68b of the ON/OFF solenoid valve 68 even when the ports 107 and 110 of the selecting switching valve 101 communicate with each other as illustrated in FIG. 5. Therefore, the hydraulic oil at the line pressure is not supplied to the control port 55 of the first switching valve 51. As a result, the spool 53 of the first switching valve 51 is moved to the second position, and the first switching valve 51 turns to the second state. As a result, the lubricant oil output from the reducing valve 41 and input to the inlet port 56 of the first switching valve 51 flows out of the second outlet port 58 of the first switching valve 51 and flows into the second path 62. At this time, too, the second switching valve 81 is in the first state. Therefore, if the transmission 1 is in the high gear, and the lubricant oil temperature detected by the temperature sensor 122 is equal to or higher than the predetermined temperature, the lubricant oil from the reducing valve 41 passes through the oil cooler 73, while bypassing the oil warmer 72, passes through both of the large-diameter orifice-installed oil passage 75 and the small-diameter orifice-installed oil passage 76, and is then supplied to the to-be-lubricated portion 71. Thus, the lubricant oil can be cooled by the oil cooler 73 before being supplied to the to-be-lubricated portion 71 when the lubricant oil temperature is equal to or higher than the predetermined temperature.

At this time, part of the lubricant oil flowing through the bypass oil passage 34 is input to the second regulation port 46 of the reducing valve 41 via the second connecting oil passage 39. As a result, the output pressure of the lubricant oil output from the outlet port 48 of the reducing valve 41 is maintained at the second pressure that is higher than the first pressure.

In this manner, because the second pressure is higher than the first pressure, a larger amount of lubricant oil can be supplied to the to-be-lubricated portion 71 when the lubricant oil temperature detected by the temperature sensor 122 is equal to or higher than the predetermined temperature, than when the lubricant oil temperature is lower than the predetermined temperature. Moreover, the design of the reducing valve 41 allows the second pressure to be increased to a value close to the line pressure if the preset pressure is the line pressure, and allows a sufficient amount of the lubricant oil to be supplied to the to-be-lubricated portion 71 when the lubricant oil temperature detected by the temperature sensor 122 is equal to or higher than the predetermined temperature. Furthermore, by turning the second switching valve 81 to the first state while the transmission 1 is in the high gear, the largest possible amount of lubricant oil can be supplied to the to-be-lubricated portion 71 when the lubricant oil temperature detected by the temperature sensor 122 is equal to or higher than the predetermined temperature, thereby making it possible to improve the reliability of the transmission 1. On the other hand, when the lubricant oil temperature is lower than the predetermined temperature, the amount of lubricant oil supplied to the to-be-lubricated portion 71 can be reduced. It is therefore possible to reduce energy loss which occurs due to stirring of the lubricant oil by a rotating member or the like at the to-be-lubricated portion 71.

Further, while the transmission 1 is in the low gear, the control unit 121 turns the ON/OFF solenoid valve 68 to the ON state when the transmission 1 is not at the shift of the gear, and turns the ON/OFF solenoid valve 68 to the OFF state when the transmission 1 is at the shift of the gear.

Figure 6:
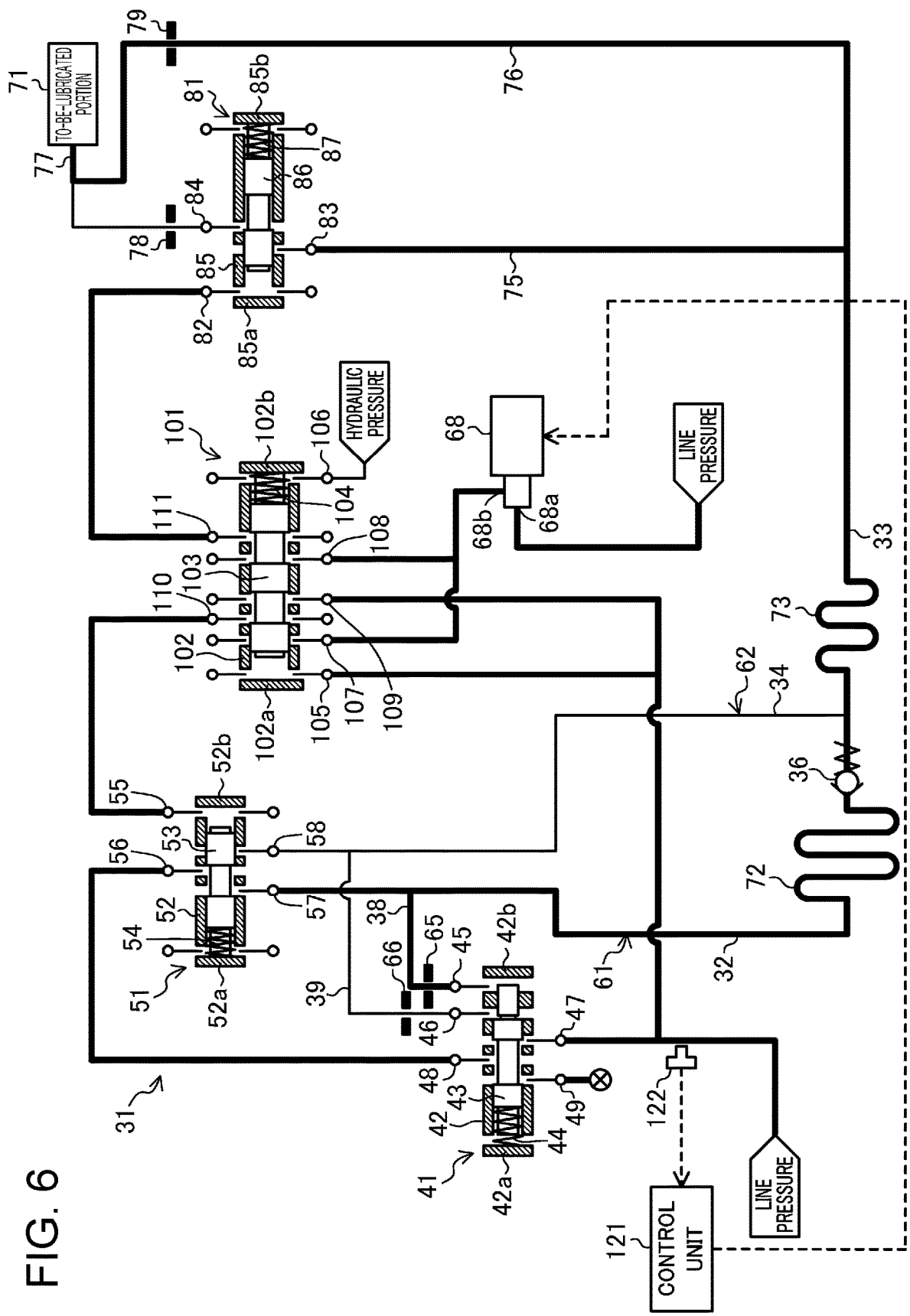
FIG. 6 is a schematic corresponding to FIG. 3, illustrating a condition in which the ON/OFF solenoid valve is switched ON while the hydraulically actuated transmission is in low gear which is lower than the predetermined gear (while the spool of the selecting switching valve is located at a second position).

If the ON/OFF solenoid valve 68 is switched ON while the transmission 1 is in the low gear (while the spool 103 of the selecting switching valve 101 is located at the second position), the hydraulic oil at the line pressure is supplied from the outlet port 68b of the ON/OFF solenoid valve 68 to the control port 82 of the second switching valve 81 via the ports 108 and 111 of the selecting switching valve 101, as illustrated in FIG. 6. As a result, the spool 86 of the second switching valve 81 is moved to the second position, and the second switching valve 81 turns to the second state. At this time, the first switching valve 51 is in the first state. Therefore, when the transmission 1 is in the low gear and is not at the shift of the gear, the lubricant oil from the reducing valve 41 passes through the oil warmer 72 and the oil cooler 73, and through the small-diameter orifice-installed oil passage 76, and is then supplied to the to-be-lubricated portion 71. At this time, the output pressure of the lubricant oil output from the outlet port 48 of the reducing valve 41 is the first pressure.

Figure 7:
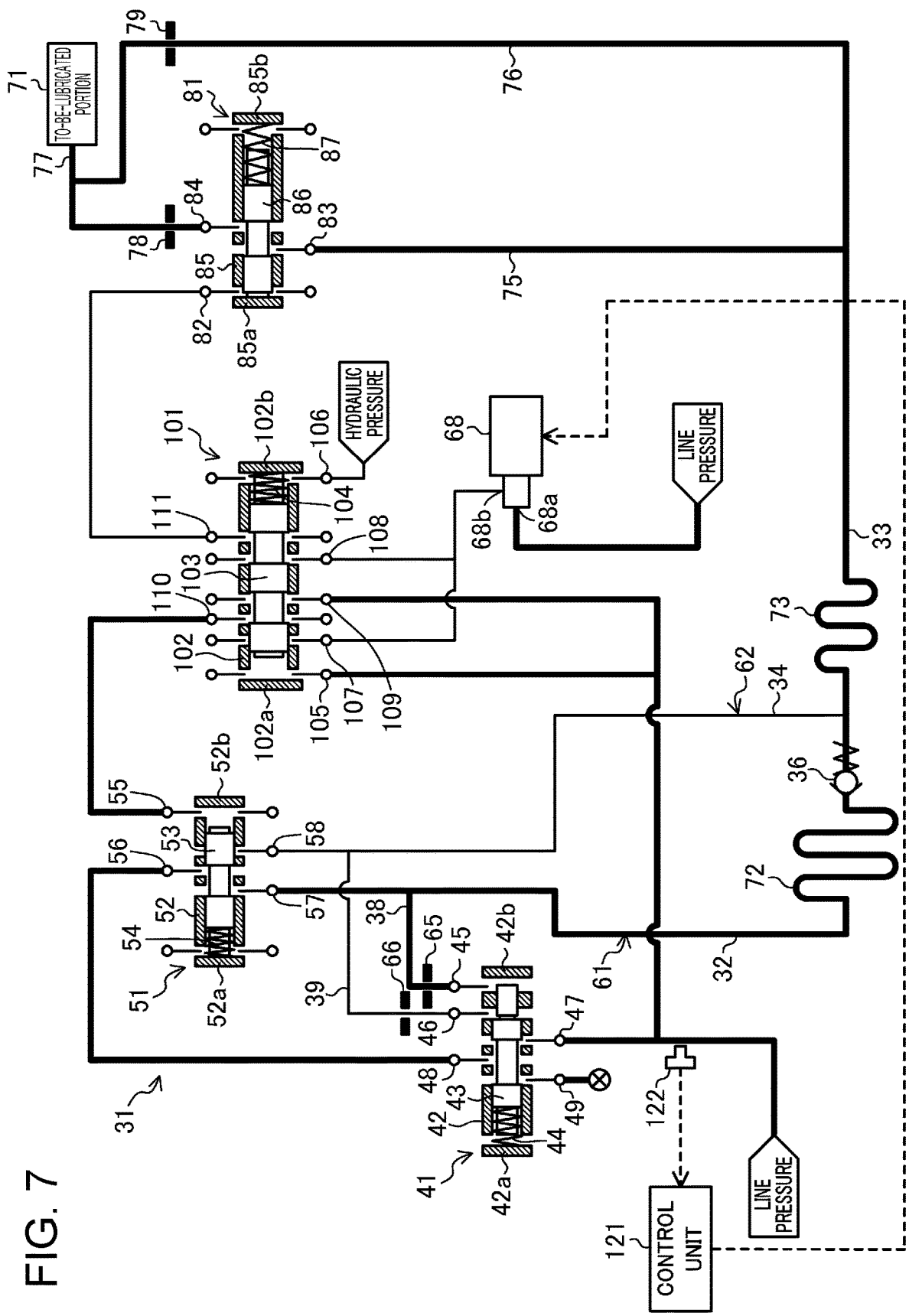
FIG. 7 is a schematic corresponding to FIG. 3, illustrating a condition in which the ON/OFF solenoid valve is switched OFF while the hydraulically actuated transmission is in the low gear (while the spool of the selecting switching valve is positioned at the second position).

If the ON/OFF solenoid valve 68 is switched OFF while the transmission 1 is in the low gear (while the spool 103 of the selecting switching valve 101 is located at the second position), no hydraulic oil at the line pressure is supplied to the control port 82 of the second switching valve 81, as illustrated in FIG. 7. As a result, the spool 86 of the second switching valve 81 is moved to the first position, and the second switching valve 81 turns to the first state. At this time, as well, the first switching valve 51 is in the first state. Therefore, when the transmission 1 is in the low gear and is at the shift of the gear, the lubricant oil from the reducing valve 41 passes through the oil warmer 72 and the oil cooler 73, and through both of the large-diameter orifice-installed oil passage 75 and the small-diameter orifice-installed oil passage 76, and is then supplied to the to-be-lubricated portion 71. At this time, as well, the output pressure of the lubricant oil output from the outlet port 48 of the reducing valve 41 is the first pressure.

As described above, a large amount of lubricant oil can be supplied to the to-be-lubricated portion 71 through both of the large-diameter orifice-installed oil passage 75 and the small-diameter orifice-installed oil passage 76 when it comes to a situation in which the transmission 1 requires a large amount of lubricant oil, such as when the transmission 1 is at the shift of the gear, while the transmission 1 is in the low gear (in particular, a frictional coupling element which is about to be coupled and released needs a large amount of the lubricant oil). However, even in such a situation in which a large amount of lubricant oil is necessary, not as much lubricant oil as that required when the transmission 1 requires a large amount of lubricant oil while the transmission 1 is in the high gear needs to be supplied to the to-be-lubricated portion 71. It is therefore possible to reduce energy loss which occurs due to stirring of the lubricant oil by a rotating member or the like at the to-be-lubricated portion 71, by selecting the first path 61 through the operation of the first switching valve 51.

The present invention is not limited to the embodiment described above, and various substitutions are possible within the scope not deviating from the essence of the claims.

For example, in the embodiment described above, the ON/OFF solenoid valve 68 is switched ON or OFF depending on whether the lubricant oil temperature detected by the temperature sensor 122 is lower than the predetermined temperature or equal to or higher than the predetermined temperature, while the transmission 1 is in the high gear. Alternatively, instead of depending on the lubricant oil temperature detected by the temperature sensor 122, the ON/OFF solenoid valve 68 may be switched ON or OFF depending on whether the load applied to the transmission 1 (for example, the load is substituted with a load of the driving source (which is input from a control unit that controls the driving source)) is lower than a predetermined load, or equal to or higher than the predetermined load. In other words, while the transmission 1 is in the high gear, the ON/OFF solenoid valve 68 is switched ON when the load of the transmission 1 is lower than the predetermined load, and switched OFF when the load of the transmission 1 is equal to or higher than the predetermined load.

The embodiment described above is merely illustrative, and is not intended to limit the interpretation of the scope of the present invention in any way. The scope of the present invention is defined by the appended claims, any modifications or changes falling within the scope of equivalency of the claims are therefore intended to be embraced therein.

INDUSTRIAL APPLICABILITY

The present invention is useful for a hydraulically actuated transmission including a lubricant oil supplying circuit for supplying a lubricant oil to a to-be-lubricated portion in the hydraulically actuated transmission, and is useful in switching a supply mode for supplying the lubricant oil to the to-be-lubricated portion in each of the time when the hydraulically actuated transmission is in high gear and the time when the hydraulically actuated transmission is in low gear.

DESCRIPTION OF REFERENCE CHARACTERS

1 Hydraulically Actuated Transmission
31 Lubricant Oil Supplying Circuit
32 Oil Warmer Passage
33 Oil Cooler Passage
34 Bypass Oil Passage
41 Reducing Valve
51 First Switching Valve
68 ON/OFF Solenoid Valve
71 To-Be-Lubricated Portion
72 Oil Warmer
73 Oil Cooler
75 Large-Diameter Orifice-Installed Oil Passage
76 Small-Diameter Orifice-Installed Oil Passage
78 Large-Diameter Orifice
79 Small-Diameter Orifice
81 Second Switching Valve
101 Selecting Switching Valve
BR2 Second Brake (Specific Frictional Coupling Element)

The invention claimed is:

1. A hydraulically actuated transmission installed in a vehicle, the hydraulically actuated transmission comprising:
    a lubricant oil supplying circuit configured to supply a lubricant oil to a to-be-lubricated portion in the hydraulically actuated transmission;
    a first switching valve provided at the lubricant oil supplying circuit, and configured to switch a supply mode for supplying the lubricant oil to the to-be-lubricated portion while the hydraulically actuated transmission is in high gear which is higher than or equal to a predetermined gear;
    a second switching valve provided at the lubricant oil supplying circuit, and configured to switch the supply mode for supplying the lubricant oil to the to-be-lubricated portion while the hydraulically actuated transmission is in low gear which is lower than the predetermined gear;
    a solenoid valve capable of achieving the switching of the supply mode by switching between supplying and not supplying the lubricant oil to the first switching valve and the second switching valve;
    a selecting switching valve configured to selectively switch between the first switching valve and the second switching valve as a valve to be connected with an outlet port of the solenoid valve outputting the hydraulic oil; and
    a specific frictional coupling element, coupling and releasing of which are switched between when the hydraulically actuated transmission is in the high gear and when the hydraulically actuated transmission is in the low gear, wherein
    the selecting switching valve is configured to operate in response to a hydraulic pressure applied to the specific frictional coupling element in accordance with the coupling and the releasing of the specific frictional coupling element, and is configured to connect the outlet port with the first switching valve while the hydraulically actuated transmission is in the high gear, and connect the outlet port with the second switching valve while the hydraulically actuated transmission is in the low gear.

2. The hydraulically actuated transmission of claim 1, wherein
    the lubricant oil supplying circuit includes a reducing valve configured to reduce a pressure of the lubricant oil having a predetermined pressure and output the lubricant oil with a reduced pressure,
    the lubricant oil supplying circuit includes a first path for supplying the lubricant oil flowing from the reducing valve to the to-be-lubricated portion sequentially through an oil warmer and an oil cooler, and a second path for supplying the lubricant oil flowing from the reducing valve to the to-be-lubricated portion through the oil cooler, while bypassing the oil warmer,
    the first switching valve is configured to selectively switch between the first path and the second path in accordance with the supplying and not supplying the lubricant oil by the solenoid valve to the first switching valve while the hydraulically actuated transmission is in the high gear, and
    the reducing valve is configured to make an output pressure of the lubricant oil output from the reducing valve higher when the second path is selected by the first switching valve, than when the first path is selected by the first switching valve.

3. The hydraulically actuated transmission of claim 2, wherein
    the lubricant oil supplying circuit further includes a large-diameter orifice-installed oil passage and a small-diameter orifice-installed oil passage arranged between the oil cooler and the to-be-lubricated portion, connected to each other in parallel, and provided with a large-diameter orifice and a small-diameter orifice, respectively, which have orifice diameters different from each other,
    the second switching valve is configured to selectively switch, while the hydraulically actuated transmission is in the low gear, between a first state in which the lubricant oil is supplied to the to-be-lubricated portion at least via the large-diameter orifice-installed oil passage, and a second state in which the lubricant oil is supplied to the to-be-lubricated portion only via the small-diameter orifice-installed oil passage, in accordance with the supplying and not supplying the hydraulic oil to the second switching valve by the solenoid valve,
    the first switching valve is configured to select the first path while the hydraulically actuated transmission is in the low gear, and
    the second switching valve is configured to be in the first state when the hydraulically actuated transmission is in the high gear.

4. The hydraulically actuated transmission of claim 2, wherein
    the lubricant oil supplying circuit includes a large-diameter orifice-installed oil passage and a small-diameter orifice-installed oil passage connected to each other in parallel and provided with a large-diameter orifice and a small-diameter orifice, respectively, which have orifice diameters different from each other, and
    the second switching valve is configured to selectively switch, while the hydraulically actuated transmission is in the low gear, between a first state in which the lubricant oil is supplied to the to-be-lubricated portion at least via the large-diameter orifice-installed oil passage, and a second state in which the lubricant oil is supplied to the to-be-lubricated portion only via the small-diameter orifice-installed oil passage, in accordance with the supplying and not supplying the hydraulic oil to the second switching valve by the solenoid valve.

5. The hydraulically actuated transmission of claim 1, wherein
    the lubricant oil supplying circuit includes a large-diameter orifice-installed oil passage and a small-diameter orifice-installed oil passage connected to each other in parallel and provided with a large-diameter orifice and a small-diameter orifice, respectively, which have orifice diameters different from each other, and
    the second switching valve is configured to selectively switch, while the hydraulically actuated transmission is in the low gear, between a first state in which the lubricant oil is supplied to the to-be-lubricated portion at least via the large-diameter orifice-installed oil passage, and a second state in which the lubricant oil is supplied to the to-be-lubricated portion only via the small-diameter orifice-installed oil passage, in accordance with the supplying and not supplying the hydraulic oil to the second switching valve by the solenoid valve.

* * * * *